US012641392B2

(12) United States Patent
Mizes et al.

(10) Patent No.: US 12,641,392 B2
(45) Date of Patent: May 26, 2026

(54) SYSTEMS AND METHODS FOR ASSIGNING USER DEVICE MOVEMENT STATES

(71) Applicant: Verizon Patent and Licensing Inc., Basking Ridge, NJ (US)

(72) Inventors: Howard Mizes, Salem, SC (US); Basavaraj Sharana Patil, Concord, NC (US); Kaiss K. Alahmady, Plano, TX (US); Daniel Jacob Abreu, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 363 days.

(21) Appl. No.: 18/537,377

(22) Filed: Dec. 12, 2023

(65) Prior Publication Data

US 2024/0214772 A1 Jun. 27, 2024

Related U.S. Application Data

(63) Continuation-in-part of application No. 18/145,955, filed on Dec. 23, 2022, now Pat. No. 12,520,102.

(51) Int. Cl.
H04W 4/021 (2018.01)
H04W 4/02 (2018.01)

(52) U.S. Cl.
CPC ........... H04W 4/021 (2013.01); H04W 4/027 (2013.01)

(58) Field of Classification Search
CPC ..... H04W 4/021; H04W 4/022; H04W 4/023; H04W 4/025; H04W 4/029; G06F 7/18; G06N 20/00; G06N 3/00

USPC ...................................................... 455/456.1
See application file for complete search history.

(56) References Cited

U.S. PATENT DOCUMENTS

| | | | | |
|---|---|---|---|---|
| 9,400,190 | B2 * | 7/2016 | Nortrup | H04W 4/40 |
| 9,766,080 | B1 * | 9/2017 | Ortiz | G01C 21/206 |
| 9,843,902 | B1 * | 12/2017 | Skudlark | H04W 4/029 |
| 10,474,955 | B1 * | 11/2019 | Santhanam | H04L 41/16 |
| 2012/0011137 | A1 * | 1/2012 | Sheha | H04L 67/52 |
| | | | | 707/E17.014 |
| 2013/0072226 | A1 * | 3/2013 | Thramann | H04W 4/029 |
| | | | | 455/456.1 |
| 2013/0090089 | A1 * | 4/2013 | Rivere | H04W 12/80 |
| | | | | 455/411 |
| 2013/0252633 | A1 * | 9/2013 | Liang | H04W 52/0251 |
| | | | | 455/456.1 |
| 2013/0267197 | A1 * | 10/2013 | Ahtisaari | H04L 12/1859 |
| | | | | 455/406 |

(Continued)

*Primary Examiner* — Jean A Gelin

(57) ABSTRACT

In some implementations, a device may obtain a set of one or more communication events associated with a user device, where the set of one or more communication events indicates respective values of one or more communication parameters. The device may determine, for each communication event, whether one or more rules are applicable to that communication event based on a comparison of values of the one or more communication parameters of that communication event and values of the one or more communication parameters of a previous communication event to that communication event in time. The device may assign, for each communication event, a movement state for that communication event based on whether a score for that communication event satisfies a threshold, where the score is a summation of one or more weights of respective rules applicable to that communication event.

20 Claims, 9 Drawing Sheets

(56) References Cited

U.S. PATENT DOCUMENTS

| | | | | |
|---|---|---|---|---|
| 2014/0378159 A1* | 12/2014 | Dolbakian | .......... | G06F 16/9537 |
| | | | | 455/456.1 |
| 2015/0106011 A1* | 4/2015 | Nesbitt | ............. | G01C 21/3484 |
| | | | | 701/417 |
| 2016/0006852 A1* | 1/2016 | Gray | ....................... | H04W 4/80 |
| | | | | 455/41.2 |
| 2016/0042367 A1* | 2/2016 | Vastbinder, Jr. | ........ | H04W 4/33 |
| | | | | 705/7.29 |
| 2016/0148164 A1* | 5/2016 | Luk | .................... | G06Q 10/1093 |
| | | | | 705/7.19 |
| 2016/0189186 A1* | 6/2016 | Fabrikant | .......... | G06Q 30/0205 |
| | | | | 705/7.34 |
| 2017/0213007 A1* | 7/2017 | Moturu | .................. | G16H 20/10 |
| 2017/0339235 A1* | 11/2017 | Chin | .................... | H04W 4/029 |
| 2017/0372267 A1* | 12/2017 | Soffer | ............... | G06Q 10/1093 |
| 2018/0014161 A1* | 1/2018 | Warren | ............ | G06F 16/24578 |
| 2018/0112996 A1* | 4/2018 | Montell | ............ | G01C 21/3682 |
| 2018/0253654 A1* | 9/2018 | Van Osten | ............. | G06Q 10/00 |
| 2018/0314740 A1* | 11/2018 | Van Osten | ............ | G06F 40/279 |
| 2019/0182195 A1* | 6/2019 | Avital | ................... | H04L 67/535 |
| 2020/0045164 A1* | 2/2020 | Kwatra | ............ | H04M 1/72463 |
| 2020/0142914 A1* | 5/2020 | Hui | ........................ | G06F 16/248 |
| 2020/0211053 A1* | 7/2020 | Shishkin | ................ | G06N 20/20 |
| 2021/0209645 A1* | 7/2021 | Shishkin | .............. | H04W 4/029 |
| 2022/0272158 A1* | 8/2022 | Naujok | ................. | H04W 12/71 |
| 2023/0276207 A1* | 8/2023 | Sood | ....................... | H04W 4/20 |
| | | | | 455/67.11 |
| 2023/0304800 A1* | 9/2023 | Pottier | ................... | G06V 20/54 |
| 2023/0410016 A1* | 12/2023 | Vertsel | .............. | G06Q 10/0637 |
| 2024/0146747 A1* | 5/2024 | Zaytsev | .............. | H04L 63/1416 |
| 2024/0152596 A1* | 5/2024 | Papadopoulos | ......... | G06F 21/44 |

* cited by examiner

100

105
Obtain training data for user device movements

110
Determine a movement state for communication event(s) in the training data using one or more rules 115
Determine rule parameters for the one or more rules based on the training data and the determined movement state(s)

Location Management Device

100

| Communication Events | | | | | | |
|---|---|---|---|---|---|---|
| Time | Lat | Long | BS ID | Cell ID | TA | Movement State |
| 9:00:00 | 34.05 | -82.78 | 107 | 654 | 1500 | Moving |
| 9:03:30 | 34.58 | -82.14 | 115 | 705 | 890 | Stationary |
| 9:05:20 | 34.58 | -82.15 | 115 | 704 | 910 | Stationary |
| 9:08:40 | 34.59 | -82.14 | 115 | 705 | 890 | Stationary |
| 9:10:15 | 34.75 | -82.55 | 127 | 675 | 1300 | Moving |

145

Determine, for each communication event, a movement state

140

Determine a score for each communication event

135

Determine whether one or more rules are applicable to the communication events

Location Management Device

100

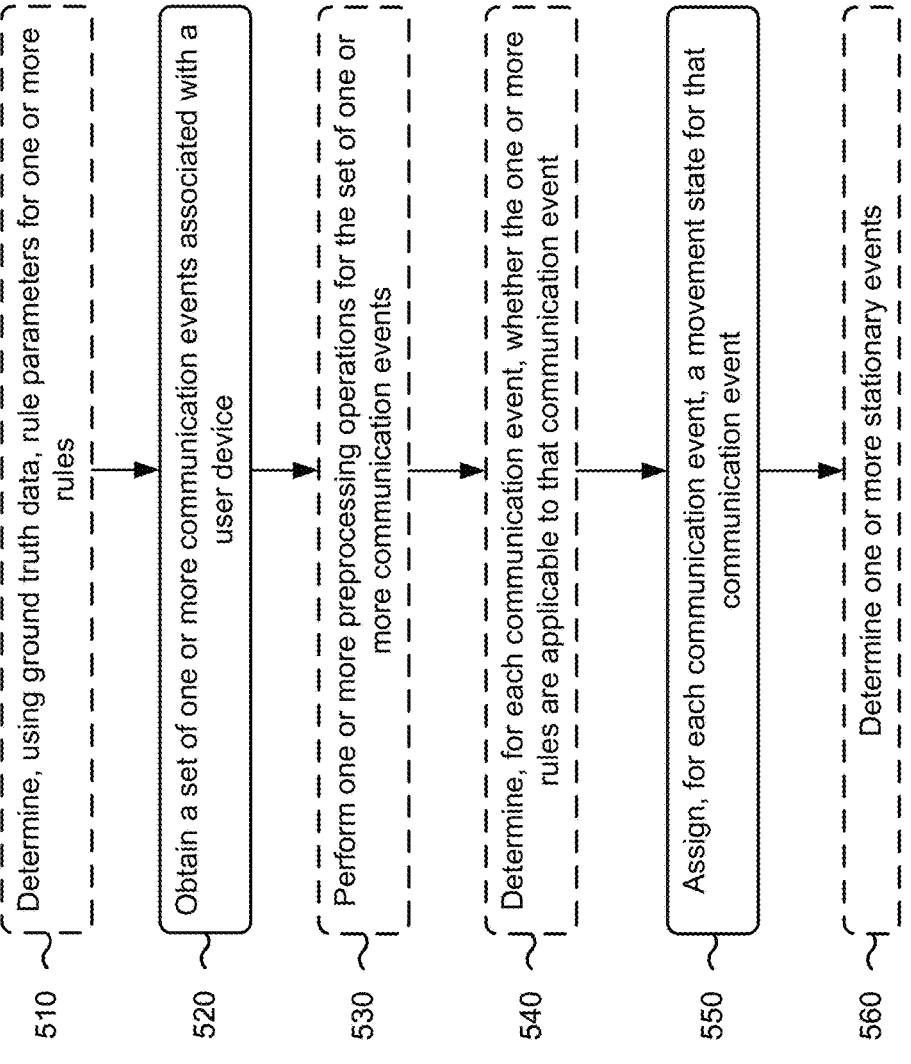

Determine, using ground truth data, rule parameters for one or more rules

510

Obtain a set of one or more communication events associated with a user device

520

Perform one or more preprocessing operations for the set of one or more communication events

530

Determine, for each communication event, whether the one or more rules are applicable to that communication event

540

Assign, for each communication event, a movement state for that communication event

550

Determine one or more stationary events

SYSTEMS AND METHODS FOR ASSIGNING USER DEVICE MOVEMENT STATES

CROSS-REFERENCE TO RELATED APPLICATION

This Patent Application is a continuation-in-part of, and claims priority to, U.S. patent application Ser. No. 18/145,955, filed on Dec. 23, 2022, and entitled "SYSTEMS AND METHODS FOR PROBABILISTIC POINT OF INTEREST VISIT COUNT ESTIMATION." The disclosure of the prior Application is considered part of and is incorporated by reference into this Patent Application.

BACKGROUND

User device tracking is a process for identifying the location of a user device (e.g., a mobile phone), whether stationary or moving. A multi-lateration of radio signals between one or more base stations (e.g., cell towers) of a network may be used to determine a position of a user device. In other words, a position of a user device may be determined using a network infrastructure of a service provider. For example, one or more base stations may monitor for a signal transmitted by a user device and determine which base station is best positioned to communicate with the user device. As the user device changes location, the base stations may monitor the signal from the user device, and the user device may be handed over to an adjacent base station as appropriate. By comparing one or more communication parameters associated with one or more base stations, a general location of a user device can be roughly determined. This may be referred to as cell tower triangulation. User device tracking may be used for location-based services that disclose the actual coordinates of a user device and/or for identifying point of interest (POI) locations at which the user device is located.

BRIEF DESCRIPTION OF THE DRAWINGS

FIG. 5 is a flowchart of an example process associated with assigning user device movement states.

DETAILED DESCRIPTION OF EXAMPLE EMBODIMENTS

Figure 1A:
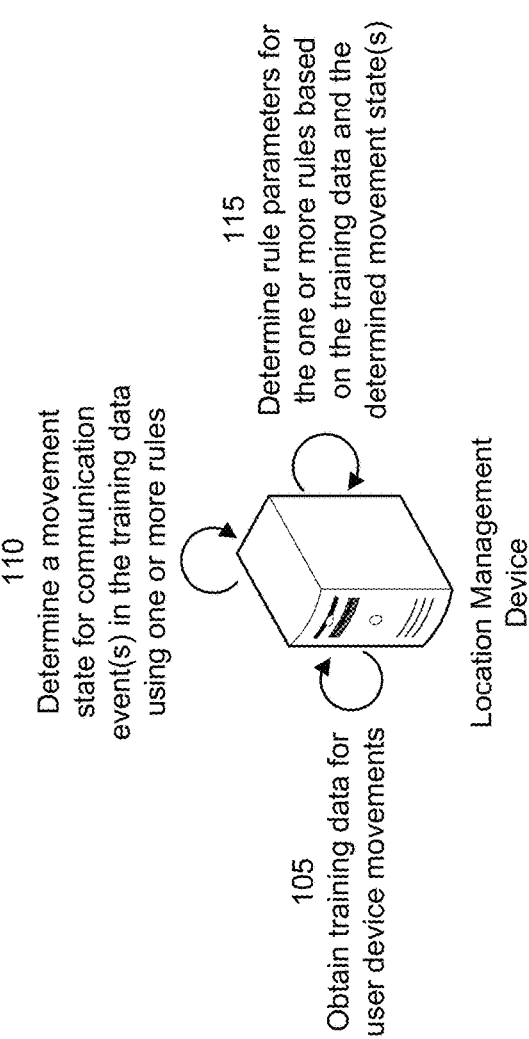
FIGS. 1A-1E are diagrams of an example associated with assigning user device movement states.

The following detailed description of example implementations refers to the accompanying drawings. The same reference numbers in different drawings may identify the same or similar elements.

A device may determine a location of a user device (e.g., a mobile phone). For example, the device may use triangulation data (e.g., cell tower triangulation data) to determine the location of the user device. For example, user devices may communicate with a core network of a wireless network via a network of transmitters and receivers on cell phone towers (e.g., base stations) and other locations that have a wide geographic coverage (e.g., cells). The device may use one or more communication parameters associated with communications between a user device and one or more base stations to determine a location of the user device. The one or more communication parameters may include a timing advance, a reference signal received power, a reference signal received quality, a received signal strength indicator, and/or a cell orientation, among other examples.

The device may determine one or more position tracks associated with the user device. For example, a position track may include a sequential series in time of geographic coordinates and/or a duration of time at a given geographic coordinate. As used herein, a position track may be referred to as a series of sequential communication events. For example, a communication event may indicate a time, a location (e.g., a longitude and latitude), an identifier of a user device, and/or values of one or more communication parameters, among other examples. For example, a communication event may be an event associated with the user device and a base station communicating one or more signals (e.g., a cell tower "ping"). Furthermore, these events can occur both "actively" while the user is actively using their communication device or "passively" caused by updates for background applications executing on the user device.

User device location estimates obtained via communication events (e.g., location data that is based on triangulation data) may be relatively inaccurate (e.g., as compared to other location data, such as global positioning device (GPS) data). For example, location estimates obtained via triangulation data may be associated with an uncertainty of an estimated user device location. A general form of an uncertainty may consist of one or more closed curves surrounding the best estimate (e.g., an estimated geographic coordinate position) of a user device location. The uncertainty may be estimated by a confidence radius (e.g., a radius around the geographic coordinate location in which a likelihood that the user device is located within the area defined by the geographic coordinate location and the confidence radius is high). However, the uncertainty or inaccuracy of the user device location estimates may increase the difficulty associated with one or more operations that use the estimated user device location. For example, because of the uncertainty or inaccuracy of the user device location estimates, it may be difficult to determine whether the user device is stationary or moving, over a certain time period.

The determination of whether the user device is stationary or moving may be useful in some scenarios. For example, the device may assign a point of interest (POI) location associated with the location of the user device. A POI location may include a geographical region or area that a user may visit for some duration of time. For example, a POI location may include a store, a business, a building, an arena, a stadium, a park, a public transportation stop (e.g., a train station, a bus stop, and/or a subway station), a parking area (e.g., a parking lot and/or a parking garage), and/or an airport, among other examples. As an example, if a user device is stationary at a POI, the device may determine, with improved reliability, that the user is visiting the or near the POI for a period of time.

In some examples, existing user device location estimates may indicate that the user device location has changed between two instances in time, when in reality the user device location was stationary between the two instances in time (e.g., such as when the two locations are both within a confidence radius of the user device location estimate). As a result, the device may be unable to determine when the user device is actually moving or is only indicated as changing location because of the uncertainty or inaccuracy of the user device location estimates. As a result, the device may consume network resources, processing resources, computing resources, and/or memory resources, among other examples, associated with analyzing and/or making determinations based on stationary determinations that are inaccurate and/or unreliable (e.g., because of the uncertainty or inaccuracy of the user device location estimates). Additionally, the uncertainty or inaccuracy of the user device location estimates may decrease the accuracy of determinations of whether a user has visited a given POI (e.g., because the user device location estimates may indicate that the user device is moving when the user device is stationary at a POI, resulting in the device determining that the user has not visited the POI). This may consume network resources, processing resources, computing resources, and/or memory resources, among other examples, associated with analyzing and/or making determinations based on visit count data that is inaccurate.

Some techniques and implementations described herein enable the assignment of user device movement states for respective communication events of the user device. In some implementations, a location management device may assign a movement state (e.g., a stationary state or a moving state) to a communication event using information indicated by one or more communication events, such as a geographic location and values of one or more communication parameters. For example, the one or more communication parameters may be indicative of movement or mobility of the user device. As an example, the one or more communication parameters may include a base station identifier, a cell identifier, a timing advance value, a signal strength parameter (e.g., a reference signal received power (RSRP) parameter or a received signal strength indicator (RSSI) parameter), and/or a signal quality parameter (e.g., a reference signal received quality (RSRQ) parameter), among other examples.

In some implementations, the location management device may assign a movement state for a communication event using a score (e.g., a movement score). The movement score may be a summed total of weights of one or more rules that are applicable to the communication event. For example, one or more rules may be defined where each rule is associated with rule parameters. The rule parameters may include a weight and/or one or more thresholds. As an example, a rule may compare values or information of one or more communication parameters between a given communication event and another communication event (e.g., a previous communication event in time). The rule may indicate that if a criterion is met for one or more communication parameters (e.g., if information has changed or remained the same, such as a base station identifier has changed or remained the same) and/or if a difference in values of a communication parameter satisfies a threshold, then the rule is applicable to the given communication event. If a rule is applicable to a given communication event, then the device may add a weight of the rule to the movement score for the given communication event. If the movement score for a given communication event satisfies a movement threshold, then the device may determine that the movement state for the given communication event is the moving state. If the movement score for a given communication event does not satisfy the movement threshold, then the device may determine that the movement state for the given communication event is the stationary state.

In some implementations, the location management device may perform one or more preprocessing operations for obtained communication event data (e.g., raw data). For example, there may be instances in which the user device communicates with a base station, but an insufficient amount of communication parameters is collected to reliably estimate the user device location. Additionally, there may be scenarios in which a user device is stationary and switches the base station via which the user device is communication, causing the estimated location of the user device to shift slightly. The one or more preprocessing operations may enable the location management device to identify communication events that include data that is inaccurate or unreliable, and to modify or remove the location estimate.

In some implementations, the location management device may determine one or more rule parameters for respective rules using training data (e.g., ground truth data). For example, the location management device may obtain the training data. The training data may include time ranges and movement state labels (e.g., that have been manually or otherwise labeled with a movement state). The location management device may determine movement states for respective communication events included in the training data using the one or more rules. The location management device may perform a classification performance evaluation using the determined movement states and the movement state labels (e.g., identifying true positives, false positives, true negatives, and false negatives). The location management device may perform one or more operations to optimize the rule parameters for respective rules based on the classification performance evaluation (e.g., to improve an accuracy of the determined movement states using the movement state labels as a ground truth).

As a result, the described techniques and implementations can be used to improve the determination of whether a user device is moving or stationary when using raw data indicated by communication events. For example, by using the one or more rules and the values of the communication parameters, the location management device may improve an accuracy of a determination of movement states for position tracks (e.g., as compared to only using the estimated location of the user device that is based on the communication parameters). In some implementations, by using one or more rules that are associated with different weights, the location management device may prioritize or emphasize changes in certain communication parameters that may be more indicative of movement. This improves the determination of the movement state for the communication event. Improving the determination of the movement state of the user device may conserve network resources, processing resources, computing resources, and/or memory resources, among other examples, that would have otherwise been associated with analyzing and/or making determinations based on movement state determinations that are inaccurate and/or unreliable (e.g., that use only the estimated user device location).

In some implementations, by performing the one or more preprocessing operations, the location management device may remove or modify inaccurate or unreliable data from the communication event data that is obtained by the location management device. This may conserve processing resources, memory resources, and/or power resources, among other examples, that would have otherwise been associated with analyzing and/or performing other operations described herein using the inaccurate or unreliable data. Additionally, the one or more preprocessing operations may improve the movement state determinations by removing outliers and/or data that may otherwise cause the location management device to incorrectly determine a movement state for the user device.

In some implementations, by determining the rule parameters using the training data, the location management device may tailor the rule parameters to the wireless communication network via which the user device is communicating. For example, different wireless communication networks may have different network conditions, different deployments (e.g., different base station deployment densities), and/or different configurations, among other examples, that may cause differences in communication parameters of communications in the wireless communication networks. Furthermore, localized differences in the same communication network may also occur. These differences in communication parameters may lead to location estimates that are indicative of movement when the user device is stationary. By using training data that is collected via a user manually logging when they are stationary or moving, or via a device that automatically accomplishes the same task using GPS or other technologies to determine movement, the location management device may determine rule parameters that are optimized to improve the accuracy of movement state determinations using communication parameters for communications in the given wireless communication network (e.g., the rule parameters may be optimized for the given wireless communication network or communication environment). By using rule parameters that are associated with (e.g., optimized for or determined for) a given wireless communication network or a given communication environment, the location management device may improve the accuracy of movement state determinations for communication events that occurred in the given wireless communication network or the given communication environment.

FIGS. 1A-1E are diagrams of an example 100 associated with assigning user device movement states. As shown in FIGS. 1A-1E, example 100 includes a location management device and a location collection device. The location collection device may be configured to obtain and/or determine a location of a user device via communication events associated with the user device and one or more base stations.

As shown in FIG. 1A, and by reference number 105, the location management device may obtain training data for user device movements. In some implementations, another device (e.g., separate from the location management device) may perform the operations described in connection with FIG. 1A. In such examples, the other device may provide, and the location management device may obtain, rule parameters for one or more rules, as described in more detail below.

The location management device may obtain the training data from log data indicating whether a user device was stationary or moving. Additionally, or alternatively, the location management device may obtain GPS data or other data that is indicative of whether the user device was stationary or moving at a given time. In some implementations, another device (e.g., rather than the location management device) may perform operations using the training data and the location collection device data, in a similar manner as described as being performed by the location management device, such as determining one or more rule parameters, as described in more detail elsewhere herein (e.g., such as in connection with reference number 110 and/or reference number 115).

The location management device (or another device included in a system that includes the location management device) may obtain training data that includes one or more training communication events indicating respective movement state labels. For example, the training data may be ground truth data. The training data may include "real-world" communication events. As used herein, "communication event" may refer to a communication between a user device and a base station that is associated with one or more communication parameters. The one or more communication parameters may include an estimated user device location (e.g., a geographic location, such as a latitude and longitude), a confidence parameter of the estimated user device location (e.g., indicating a confidence level of the accuracy of the latitude and longitude), a user device identifier, a base station identifier, a cell identifier, a base station location, a timing advance parameter, one or more signal strength parameters of a serving cell (e.g., a reference signal received power (RSRP) of a serving cell), one or more signal quality parameters of the serving cell (e.g., a reference signal receive quality (RSRQ) of the serving cell), one or more one or more signal strength parameters of one or more neighbor cells (e.g., RSRPs of a one or more neighbor cells), one or more signal quality parameters of the one or more neighbor cells (e.g., RSRQs of the one or more neighbor cells), a quantity of neighbor cells (e.g., a quantity of detected and/or measured neighbor cells), a movement distance parameters (e.g., indicating a change in distance (such as in meters) of a position of the user device between a current communication event and a previous communication event), an environment parameter (e.g., indicating a communication environment in which the user device is operating, such as an indoor environment, an outdoor environment, a mobile environment, a rural environment, or a urban environment), a cell change parameter (e.g., a flag indicating that a serving cell of the user device has changed), a base station change parameter (e.g., a flag indicating that a base station via which the user device is communicating has changed), an intersite distance parameter (e.g., a parameter indicating a distance (an average distance) to one or more neighbor cells via which the user device has communicated with during a communication event), and/or one or more Doppler parameters, among other examples.

For example, the training data may be communication events where a user, the location management device, and/or another device logs or labels whether the user device is stationary at a known location (e.g., with a known latitude and longitude) for some amount of time. In some implementations, the training data may include GPS data or other location data. For example, a user may carry a tracking device or may agree to share GPS data collected by a user device. In some implementations, the location management device may obtain log data which indicates locations (e.g., POIs) that a user has visited, a time of the visit, and/or an amount of time that the user visited the location. The location management device may determine, using mapping data, a geographic location (e.g., a longitude and latitude) of the indicated locations. The location management device may label communication events that occurred at the indicated locations during the indicated times with a stationary movement label.

As another example, the training data may include data collected by one or more training devices deployed in a wireless communication network. The training device(s) may include user devices, mobile devices, unmanned aerial vehicles (UAVs), and/or other devices that are deployed in the wireless communication network. The training device(s) may move to different geographic locations while communicating via the wireless communication network. The training device(s) may track or maintain an indication of when the training device(s) are moving or stationary. This information may be used by the location management device or another device to label communication events associated with the training device(s) with a movement state (e.g., a moving state or a stationary state).

In some implementations, the training data may indicate a starting time (e.g., at which the device becomes stationary), a duration for which the device is stationary, and/or a location at which the device is stationary, among other examples. In some examples, the training data may include the starting time, the duration, and the location (e.g., a comprehensive ground truth). In other examples, the training data may include partial information, such as a subset of the starting time, the duration, and the location (e.g., a noncomprehensive ground truth).

As shown by reference number 110, the location management device may determine a movement state for one or more communication events (e.g., training communication events) in the training data using one or more rules. For example, the location management device may assign, for each training communication event in the training data, a movement state for that training communication event using the one or more rules. The location management device may determine and/or assign the movement state in a similar manner as described in more detail elsewhere herein, such as in connection with FIG. 1D.

Each rule may be associated with one or more rule parameters. The one or more rule parameters may include one or more thresholds, one or more weights, and/or one or more other rule parameters. A threshold may be indicative of a difference in values of a given communication parameter that is indicative of movement. For example, for some rules, the rule may be applicable only if a difference between values of a communication parameter for two communication events satisfies the threshold. A weight may indicate a level at which a rule being applicable is indicative of movement of a user device (e.g., a weight may indicate a level at which the rule being applicable is indicative or suggests that the user device is moving). For example, a higher weight may indicate that if the rule is applicable for a communication event, then there is a higher likelihood that the user device is moving (e.g., as compared to a rule with a lower weight).

As shown by reference number 115, the location management device may determine rule parameters for the one or more rules based on the training data and the determined movement state of the one or more training communication events. For example, the location management device may determine rule parameters for respective rules of the one or more rules based on a classification performance evaluation using the determined movement state and the respective movement state labels. For example, the location management device may identify one or more true positive (TP) events (e.g., where both the determined movement state and the movement state label for a training communication event indicate that the user device is stationary), one or more false negative (FN) events (e.g., where the determined movement state is a moving state and the movement state label is a stationary label), one or more false positive (FP) events (e.g., where the determined movement state is a stationary state and the movement state label is a moving label), and/or one or more true negative (TN) events (e.g., where both the determined movement state and the movement state label for a training communication event indicate that the user device is moving).

The location management device may determine one or more metrics based on the classification performance evaluation, such as a recall metric $$\left( e.g., \frac{TP}{(TP+FN)}, \right.$$

a precision metric $$\left( e.g., \frac{TP}{(TP+FP)} \right),$$

and/or an accuracy metric $$\left( e.g., \frac{(TP+TN)}{(TP+FP+FN+TN)} \right),$$

among other examples. The location management device may modify rule parameter(s) for one or more rules to optimize the one or more metrics. For example, the location management device may iteratively modify rule parameter(s) for one or more rules to identify a combination of rule parameters that result in an optimization of the one or more metrics.

In some implementations, the one or more rules may be associated with one or more sets of rule parameters. For example, a given rule may be associated with multiple sets of one or more rule parameters. As an example, each set of one or more rule parameters may be optimized for a given wireless communication network, a given geographic area or location, and/or a given communication environment (e.g., an urban or city environment versus a rural environment), among other examples. For example, the location management device may use training data collected in a given wireless communication network, a given geographic area or location, and/or a given communication environment to determine rule parameters for the given wireless communication network, the given geographic area or location, and/or the given communication environment. The location management device may obtain training data from different wireless communication networks, different given geographic areas or locations, and/or different communication environments to determine the multiple sets of one or more rule parameters for one or more rules.

Figure 1B:
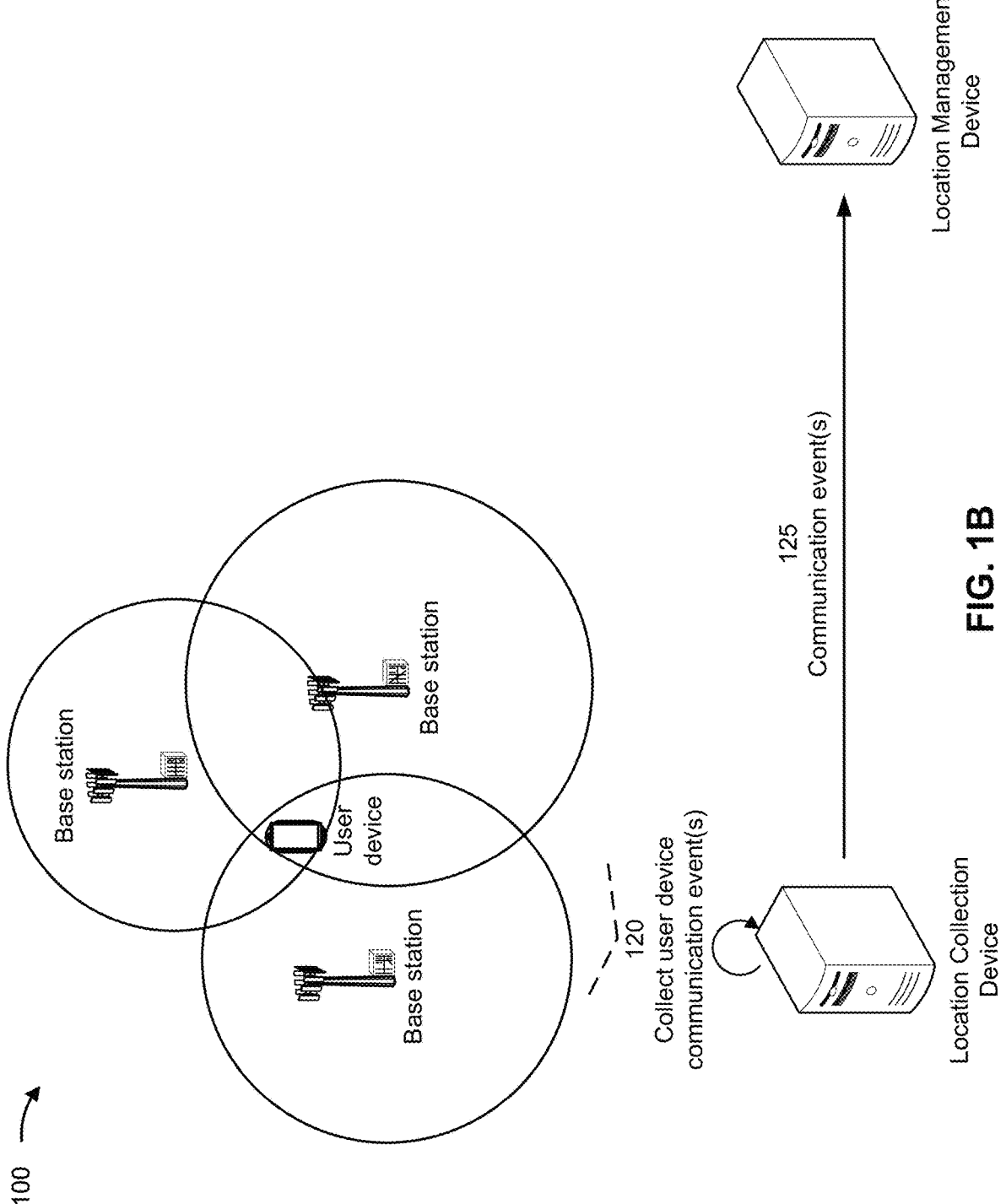

As shown in FIG. 1B, a location of a user device may be determined based on communications with one or more base stations (e.g., cell towers) of a wireless network. For example, the wireless network may include a radio access network (RAN). The RAN may support, for example, a cellular radio access technology (RAT). The RAN may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for user devices. The RAN may transfer traffic between a user device (e.g., using a cellular RAT), one or more base stations (e.g., using a wireless interface or a backhaul interface, such as a wired backhaul interface), and/or a core network. The RAN may provide one or more cells that cover geographic areas. A user device may include a mobile phone (e.g., a smart phone or a radiotelephone), a user equipment (UE), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, a vehicle (e.g., an autonomous vehicle or a component of a vehicle), or a similar type of device.

For example, a user device may communicate with one or more base stations (e.g., three base stations are shown in FIG. 1B as an example). As shown by reference number 120, the location collection device may collect user device location data. The user device location data may also be referred to as triangulation data or cellular tower triangulation data. For example, the location collection device may collect or obtain one or more communication parameters associated with communications between the user device and the one or more base stations. For example, the one or more communication parameters may include a timing advance, a reference signal received power, a reference signal received quality, a received signal strength indicator, and/or a cell orientation, among other examples as described elsewhere herein. In some implementations, the location management device may determine one or more communication parameters (e.g., derived parameters, such as an environment parameter) from one or more other communication parameters (e.g., raw parameters, such as an RSRP or an RSRQ). From the one or more communication parameters, the location collection device may estimate a user device location. In some implementations, a base station (or another network device, such as a core network device or a central unit (CU)) may determine a location of the user device (e.g., geographic coordinates associated with the user device) as well as an uncertainty in the measurement based on the one or more communication parameters. In such examples, the base station or other network device may transmit, and the location collection device may receive, an indication of the location of the user device. In other examples, the location collection device may determine a location of the user device (e.g., geographic coordinates associated with the user device) based on the one or more communication parameters. Locations of multiple user devices may be collected and/or determined in a similar manner. For example, the location collection device may determine or obtain one or more communication events of a user device. A communication event may include an estimated location of the user device at a given time (e.g., for a given communication with a base station) along with one or more communication parameters.

In some implementations, a determined location of a user device (e.g., based on triangulation data) may be associated with an uncertainty range. The uncertainty range may be an area around a geographic coordinate in which a likelihood that the user device is included in the uncertainty range has a probability of being located that satisfies a threshold. For example, an uncertainty in a location of a user device can be represented by a circle with the user device's most likely position at the center of the circle, and the radius of the circle chosen so that the user device's true position is somewhere in the circle with a probability that satisfies the threshold. The uncertainty range for a given user device location may be defined by a geographic coordinate location associated with the user device (e.g., determined based on triangulation data associated with the user device) and the radius.

As shown by reference number 125, the location collection device may transmit or provide, and the location management device may receive or obtain, a set of one or more communication events of a user device (or multiple user devices). The set of one or more communication events may indicate locations (e.g., geographic coordinates, such as a latitude and a longitude) associated with the user device. For example, the set of one or more communication events may indicate a geographic coordinate location for the user device. The location management device may obtain the location data associated with the one or more user devices. The location data may indicate, for the one or more user devices, respective geographic locations. For example, for a given user device, the set of one or more communication events may indicate a geographic coordinate location, and/or one or more communication parameters.

In some implementations, the location collection device may periodically provide the location data to the location management device. For example, the location collection device may provide the location data for locations collected over a given time frame, such as an hour, a day, a week, and/or a month, among other examples. As an example, the location collection device may provide the location data to the location estimation device at an end of a day, indicating user device locations collected for the day.

Figure 1C:
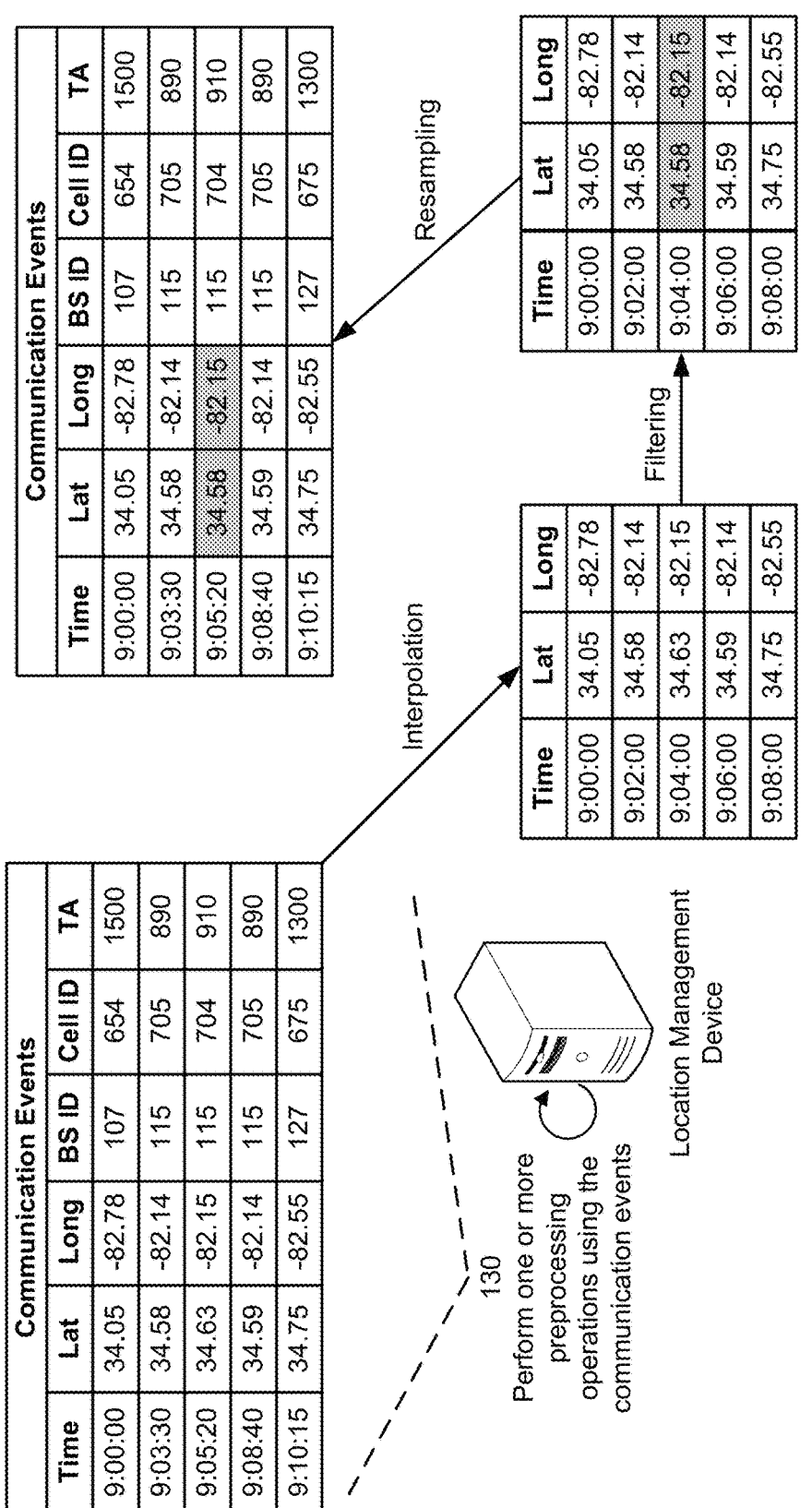

As shown in FIG. 1C, and by reference number 130, the location management device may perform one or more preprocessing operations using the communication events. For example, the location management device may perform one or more preprocessing operations to filter a set of one or more communication events of a user device. The one or more preprocessing operations may enable the location management device to identify and remove or filter outlier data from the set of one or more communication events. For example, there may be instances when the user device communicates with a base station, but an insufficient amount of communication parameters is collected to reliably estimate the user device position. For example, timing advances and/or signal strengths may be absent from the measurement. Rather than use the resulting inaccurate position estimate in the analysis, these communication events may be removed from the data stream and may not considered by the location management device for further analysis. For example, the one or more preprocessing operations may include the location management device identifying communication events that do not have complete data (e.g., data for one or more communication parameters). The location management device may remove the identified communication events from the set of one or more communication events (e.g., the set of one or more communication events may be cleaned to remove identified outliers).

Additionally, or alternatively, the one or more preprocessing operations may include the location management device smoothing or filtering data included in the set of one or more communication events. For example, when a user device is stationary, the user device may communicate primarily with one base station, but at times communicate with a separate base station. Because the separate base station may be at a different location, the position estimate of the user device may appear to move slightly, when in reality the user device is stationary. The one or more preprocessing operations may enable the location management device to identify and filter or smooth such data. The one or more preprocessing operations may be performed for location data indicated by the set of one or more communication events. In some implementations, the one or more preprocessing operations may be performed separately for latitude data and longitude data, or together in a multidimensional fashion.

For example, as shown in FIG. 1C, the one or more preprocessing operations may include an interpolation operation. Communication events do not occur at a regular cadence, resulting in irregularly spaced time series. However, some filtering techniques require data at regularly spaced time series data, where the time increment between sequential measurements are the same across the sequence of measurements. For example, the location management device may perform an interpolation operation to convert a time series of the set of one or more communication events from an irregularly spaced time series to a regularly spaced time series. The interpolation operation may enable the location management device to identify and estimate missing or outlier data points based on surrounding values (e.g., to help to smooth out irregularities in the data and ensure a more continuous representation of the data). For example, the interpolation operation may include selecting a time step size (e.g., 120 seconds). The time series of the location data may be converted (e.g., from an irregular time series) to a regular time series (e.g., that is based on the time step size). The interpolation operation may include a linear interpolation operation, a cubic spline operation, or another interpolation operation.

As shown in FIG. 1C, the one or more preprocessing operations may include a filtering operation (e.g., performed after the interpolation operation). The filtering operation may include a one-dimensional filtering operation. In some implementations, the filtering operation may include a median filtering operation (e.g., a rolling median filtering operation). For example, the location management device may perform a median filtering operation to filter the set of one or more communication events using the regular time series to obtain a filtered set of one or more communication events. A parameter of a median filter may be the kernel size, which may translate to a window to consider for each time step. For example, if the time step size is 120 seconds and the kernel size is 21, 10 time steps before and 10 time steps after each point may be considered in the filtering operation for a time window of +/−20 minutes. Each point in the time series may be replaced by the median of the N points (where N is the kernel size) surrounding that time point. The filtering operation may enable the location management device to eliminate spurious jumps in location data (e.g., that may occur with base station switches).

In some implementations, the one or more preprocessing operations may include a resampling operation. For example, the location management device may perform a resampling operation of the filtered set of one or more communication events using the original irregular time series. For example, the one or more preprocessing operations may include resampling the filtered set of one or more communication events using the original (irregular) time spacing. This allows a preprocessed position estimate to be recombined with the original communication parameters of the position estimate.

For example, as shown in FIG. 1C, in the set of one or more communication events obtained by the location management device, a latitude value of a communication event may be an outlier. For example, as shown in FIG. 1C, the communication event occurring at the time 9:05:20 may have a latitude value that is an outlier when viewed in context of surrounding communication events (e.g., a latitude of 34.63 may be an outlier in context of ith latitudes that range between 34.58 and 34.59). For example, during that communication event, the user device may communicate with the wireless network via a different cell (e.g., with a cell ID of 704, rather than a cell ID of 705), which may result in a variation in the location estimate (e.g., even if the user device was stationary at this time). As shown in FIG. 1C, the one or more preprocessing operations may enable the location management device to filter the location data (e.g., as shown by the grey boxes) for that communication event to smooth the outlier data.

Figure 1D:
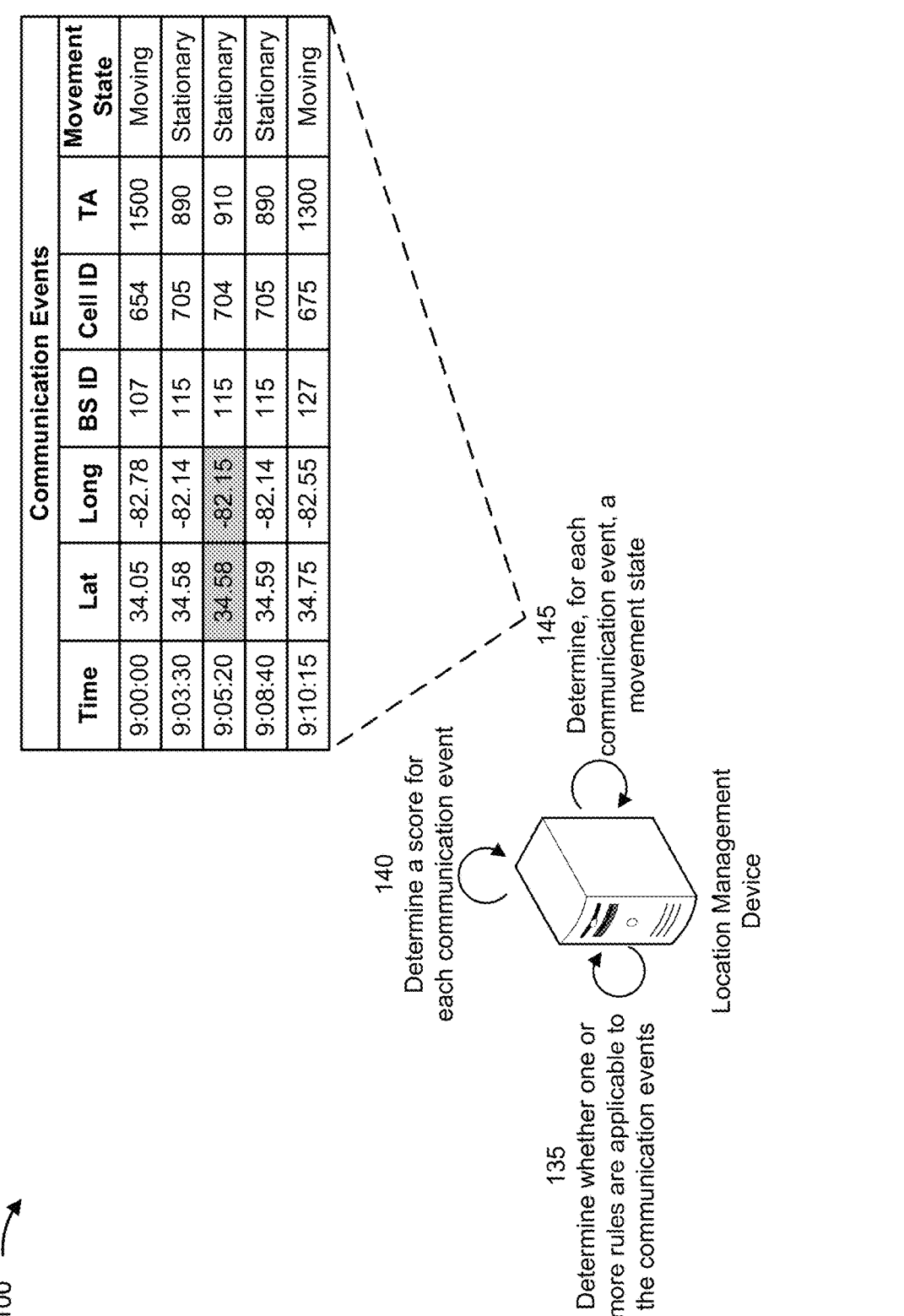

As shown in FIG. 1D, the location management device may assign a movement state (e.g., a moving state or a stationary state) to each communication event in the set of one or more communication events. As shown by reference number 135, the location management device may determine, for each communication event in the set of one or more communication events, whether one or more rules are applicable to that communication event based on a comparison of values of the one or more communication parameters of that communication event and values of the one or more communication parameters of another communication event in the set of one or more communication events. The other communication event may be a communication event that occurred previous in time to the communication event. In some implementations, the other communication event may be a previous communication event to that communication event in time (e.g., directly previous in a time sequence or order of the set of one or more communication events).

As described elsewhere herein, an applicability of the one or more rules may be indicative of movement of the user device. For example, the one or more rules may be associated with respective weights. A weight for a rule may indicate a level at which the applicability of the rule is indicative of movement (e.g., a greater weight may indicate that the rule being applicable is more indicative of movement of the user device).

The one or more rules may be associated with respective rule parameters. The rule parameters may include the weight, one or more thresholds (e.g., rule thresholds), and/or another rule parameters. For example, a rule parameter may include a criterion for at least one communication parameter of the one or more communication parameters. The criterion may include information (e.g., an identifier) remaining the same or changing between two communication events. Additionally, or alternatively, a rule parameter may include a rule threshold for a comparison of values of at least one communication parameter of the one or more communication parameters. Additionally, or alternatively, a rule parameter may include a distance threshold for a comparison of locations of that communication event and the other communication event.

In some implementations, the location management device may determine the rule parameters to use based on a location, a wireless communication network, and/or a communication environment, among other examples, in which the user device was operating when the communication event(s) occurred. For example, as described elsewhere herein, one or more rules may be associated with multiple sets of one or more rule parameters. The location management device may apply the rule parameters that are associated with (e.g., that are determined for or optimized for) the location, a wireless communication network, and/or a communication environment, among other examples, in which the user device was operating when the communication event(s) occurred. This may improve the determination of the movement state for each communication event.

To determine if a rule is applicable for a given communication event, the location management device may compare information for the given communication to information for a previous communication event (e.g., previous to the given communication event in time). For example, if a criterion of a rule parameter for a given rule is met (e.g., based on a comparison of information for a communication parameter of the given communication and the previous communication event), then the rule may be applicable for the given communication event. Additionally, or alternatively, if a difference in values of a communication parameter (e.g., indicated by the given communication and the previous communication event, such as a difference in timing advance values) satisfies a rule threshold indicated by a rule parameter of a rule, then the rule may be applicable for the given communication event. For example, each rule may compare current values of a subset of the communication parameters to previous values of the subset of the communication parameters. When the values or information differ significantly, this may indicate that the user device is more likely to be moving. Conversely, when the values are the same or similar, this may indicate that the user device has not moved.

As an example, a rule, of the one or more rules, may be associated with a rule threshold and a communication parameter of the one or more communication parameters. In such examples, the location management device may determine, for each communication event, whether a difference between a first value of the communication parameter and a second value of the communication parameter satisfies the rule threshold. The first value may be indicated by a given communication event and the second value is indicated by the previous communication event to that communication in time. The rule may be applicable to the given communication event if the difference satisfies the rule threshold.

For example, the rules may use communication parameters that may be indicative of movement. For example, the rules may use communication parameters such as an estimated geographic location (e.g., latitude and longitude values), a base station identifier, a cell identifier, a timing advance (TA) value, an environment (e.g., a communication environment), a distance between the user device and the base station, a signal strength parameter, a signal quality parameter, and/or another communication parameter that is indicative of movement of the user device. For example, if the user device switches the base station via which the user device is communicating, that switching may indicate that the user device is moving (e.g., because the user device may be moving outside of a coverage area of the base station). As another example, changing cells may be indicative of movement because a cell may be a coverage area of the base station and changing cells may indicate that the user device is moving between different coverage areas. A single base station may support one or more cells.

The timing advance value may be an adjustment of the timing of signals between the user device and the base station. For example, the timing advance value may be used to control a timing of uplink transmissions by a user device such that the uplink transmissions are received by a base station at a time that aligns with an internal timing of the base station. The timing advance value may be indicative of a distance between the user device and the base station (e.g., a larger timing advance value may indicate a larger distance between the user device and the base station, because a larger timing offset may be needed to compensate for the larger propagation delay of a transmitted signal). Therefore, a difference in the timing advance value may indicate that the user device is moving. As another example, if a signal strength or a signal quality of signals between the user device and the base station changes, this may be indicative of movement of the user device (e.g., because if the user device and the base station are both stationary, then the wireless communication channel between the devices may remain relatively constant). As another example, if an estimated distance between the user device and a base station changes, this may be indicative of user device movement. For example, if the reported distance between the user device and the base station that the user device is communicating with changes and the base station remains the same, then this may be more indicative of movement compared to the distance changing and the base station changing (e.g., because if the base station changes then it would be expected that the distance between the user device and the base station changes even if the user device is stationary).

For example, a rule may be associated with a difference between location estimates of the user device. For example, if a difference between latitudes and/or longitudes of a current communication event and a previous communication event satisfies a distance threshold, then the rule may be applicable to the current communication event. As another example, a rule may be associated with a cell change. For example, if a base station identifier of a current communication event and a previous communication event remains the same and a cell identifier of the current communication event and the previous communication event are different, then the rule may be applicable to the current communication event.

As another example, a rule may be associated with a base station change. For example, if a base station identifier of a current communication event is different than a base station identifier of a previous communication event, then the rule may be applicable to the current communication event. As another example, a rule may be associated with a timing advance value change for the same base station. For example, if the base station identifier of a current communication event and a previous communication event remains the same and a difference in timing advance values of the current communication event and the previous communication event satisfies a timing advance threshold, then the rule may be applicable to the current communication event.

In some examples, a rule may indicate scenarios in which there is a likelihood that the user device is stationary. In such examples, the rule may have a negative weight value (whereas a rule indicating a scenario in which there is a likelihood that the user device is moving may have a positive weight value). For example, if a base station identifier and a cell identifier of the current communication event and the previous communication event are the same, a rule may be applicable to the current communication event (e.g., with a negative weight value to indicate it is more likely that the user device is stationary). The described rules are provided as examples and different rules may be used for assigning a movement state in a similar manner as described herein. For example, in some cases, a rule may have a positive weight value to indicate it is more likely that the user device is stationary or a negative weight value to indicate it is more likely that the user device is moving.

If a rule is applicable to a given communication event, then a weight associated with the rule may be added to a score (e.g., a movement score) for the given communication event. For example, as shown by reference number 140, the location management device may determine a score (e.g., a movement score) for each communication event. A movement score for a given communication event may be a summation of the weights of rule(s) that are applicable to the given communication event. For example, for each rule that is determined to be applicable to a given communication event, the location management device may add the weight for that rule to the movement score of the given communication event. In other words, the score may be a summation of one or more weights of respective rules, of the one or more rules, applicable to that communication event. The movement score may be initialized to zero and may be modified based on the rules that the location management device determines to be applicable to a given communication event, as described elsewhere herein.

As shown by reference number 145, the location management device may determine, for each communication event, a movement state. The movement state may be a moving state (e.g., indicating that the user device was moving at the time the communication event occurred) or a stationary state (e.g., indicating that the user device was stationary at the time the communication event occurred). For example, the location management device may assign, for each communication event in the set of one or more communication events, a movement state for that communication event based on whether a score for that communication event satisfies a threshold (e.g., a movement threshold).

The movement threshold may be a tunable or configurable value that may be determined and/or optimized in a similar manner as described herein, such as in connection with FIG. 1A. For example, the movement threshold may be a rule parameter, as described elsewhere herein. As an example, if the movement score for a communication event is greater than (or equal to) the movement threshold, then the location management device may determine that the movement state for the communication event is the moving state. If the movement score for the communication is less than (or equal to) the movement threshold, then the location management device may determine that the movement state for the communication event is the stationary state.

Figure 1E:
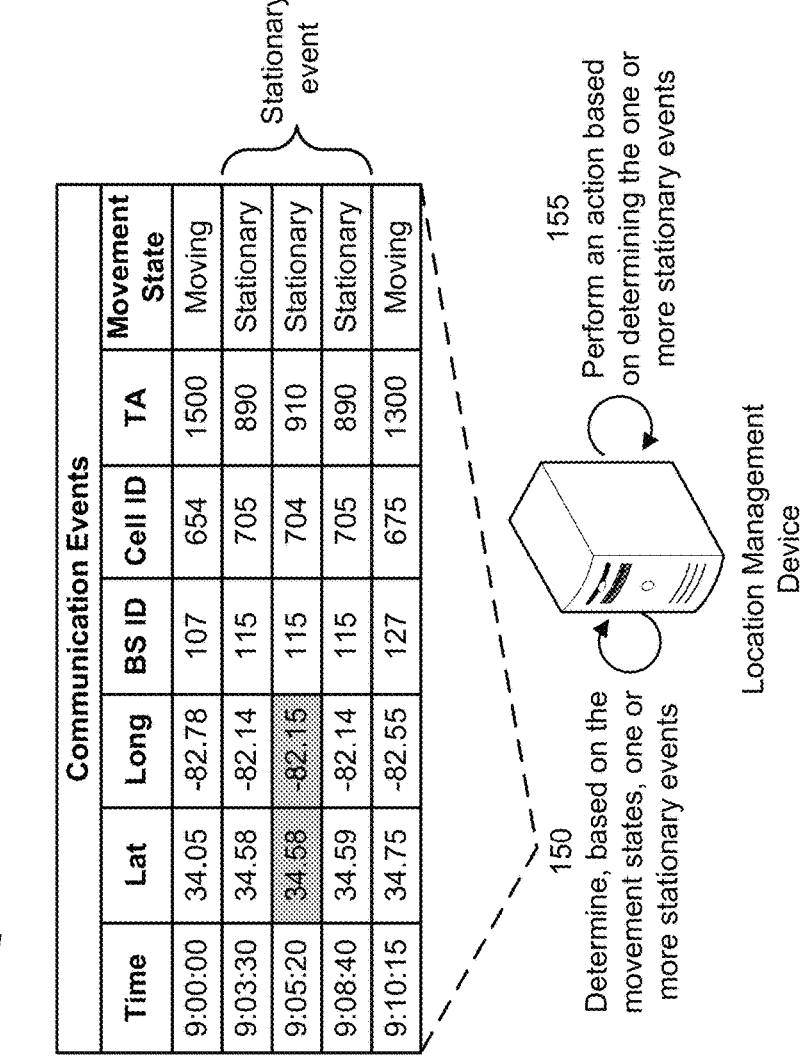

As shown in FIG. 1E, and by reference number 150, the location management device may determine, based on the movement states, one or more stationary events. A stationary event may be a series of one or more (in time) communication events that are assigned to the stationary state. In some examples, the one or more communication events may be consecutive. For example, as shown in FIG. 1E, a quantity of communication events (may be associated with the stationary state. If the quantity satisfies a stationary event threshold, then the location management device may detect a stationary event. In other examples, the one or more communication events may not be consecutive. For example, the quantity of communication events may include one or more communication events assigned the moving state that occur between the communication events that are assigned to the stationary state. For example, the location management device may determine that one or more communication events assigned the moving state are outliers in context of the communication events that are associated with the stationary state. As a result, the location management device may detect a stationary event even if the communication events associated with the stationary state do not occur consecutively. A stationary event may indicate that the user device is stationary at a given location for some period of time, such as visiting a POI location, among other examples. For example, the location management device may determine one or more periods of time during which the user device is stationary based on the movement state of a quantity of consecutive communication events, in the set of one or more communication events, being the stationary event.

In some implementations, the location management device may identify a quantity of consecutive communication events, in the set of one or more communication events, as having the stationary state. The location management device may determine an amount of time associated with the quantity of consecutive communication events based on a first time of a first communication event in the quantity of consecutive communication events and a second time of a last communication event in the quantity of consecutive communication events. For example, as shown in FIG. 1E, the first time may be 9:03:30 and the second time may be 9:08:40, for an amount of time of 5 minutes and 10 seconds. The location management device may determine that the user device is stationary based on the amount of time satisfying a time threshold.

As shown by reference number 155, the location management device may perform an action based on determining the one or more stationary events. For example, the location management device may determine that the user device is stationary at a POI based on the movement state of a quantity of consecutive communication events, in the set of one or more communication events, being the stationary state.

Additionally, or alternatively, the location management device may determine a dwell time at the POI based on a first time of a first communication event in the quantity of consecutive communication events and a second time of a last communication event in the quantity of consecutive communication events. For example, as shown in FIG. 1E, the dwell time may be 5 minutes and 10 seconds. The dwell time may be the amount of time that the user device was stationary at a given location (e.g., a POI location). The dwell times may be used to enhance POI visit count determinations.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
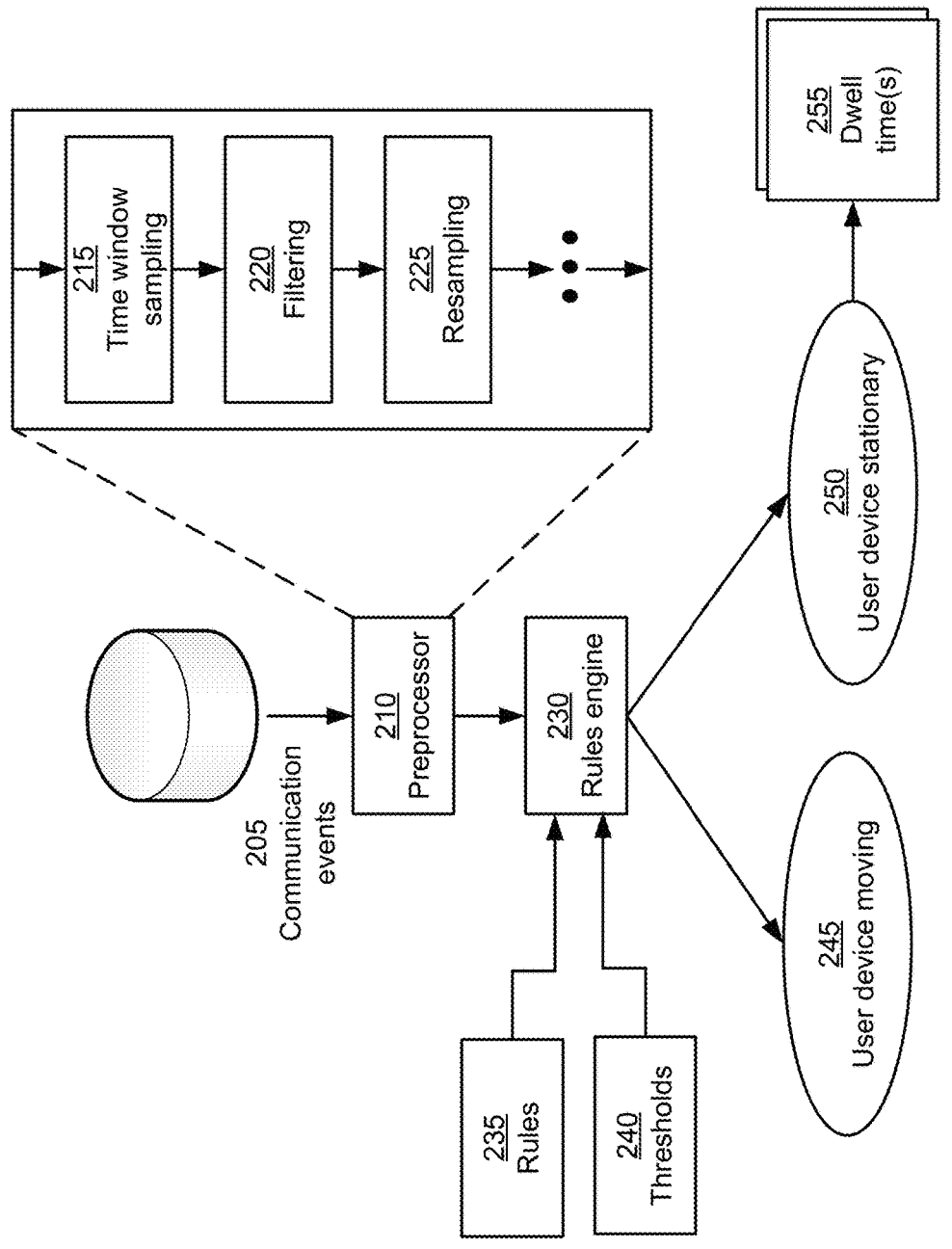
FIG. 2 is a diagram of an example associated with assigning user device movement states.

FIG. 2 is a diagram of an example 200 associated with assigning user device movement states. As shown in FIG. 2, example 200 includes one or more operations that may be performed by the location management device, as described elsewhere herein.

As shown in FIG. 2, the location management device may obtain communication events 205 for a user device (e.g., via a data stream or periodically). The location management device may include a preprocessor 210. The preprocessor 210 may perform one or more preprocessing operations using the communication events 205. For example, the preprocessor 210 may perform time window sampling 215 of the communication events 205 (e.g., via an interpolation operation). Additionally, the preprocessor 210 may perform filtering 220 (e.g., median filtering or another type of filtering) to filter the communication events 205. Additionally, the preprocessor 210 may perform resampling 225 to recover the original irregularly spaced communication events.

The preprocessed communication events may be provided to a rules engine 230. The rules engine 230 may determine whether one or more rules are applicable to each communication event, in a similar manner as described herein. For example, the rules engine 230 may be configured with one or more rules 235 and one or more thresholds 240. The one or more thresholds 240 may include one or more rule thresholds (e.g., for one or more rules of the rules 235), one or more distance thresholds, one or more movement thresholds, and/or other thresholds described herein. The rules engine 230 may assign a movement state for one or more communication events included in the communication events 205.

For example, the rules engine 230 may categorize one or more communication events into a user device moving category 245 (e.g., for communication events assigned a moving state). The rules engine 230 may categorize one or more communication events into a user device stationary category 250 (e.g., for communication events assigned a stationary state). For communication events categorized in the user device stationary category 250, the location management device may determine one or more dwell times 255, as described elsewhere herein. For example, a dwell time 255 may indicate an amount of time (e.g., a duration) that the user device is stationary at a given location (e.g., at a POI).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
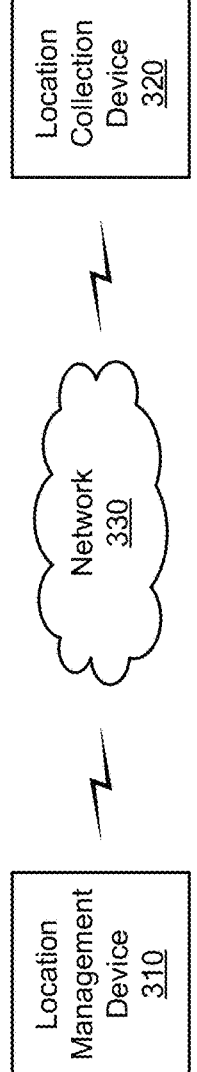
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a location management device 310, a location collection device 320 and a network 330. Devices of environment 300 may interconnect via wired connections, wireless connections, or a combination of wired and wireless connections.

The location management device 310 may include one or more devices capable of receiving, generating, storing, processing, providing, and/or routing information associated with assigning user device movement states, as described elsewhere herein. The location management device 310 may include a communication device and/or a computing device. For example, the location management device 310 may include a server, such as an application server, a client server, a web server, a database server, a host server, a proxy server, a virtual server (e.g., executing on computing hardware), or a server in a cloud computing system. In some implementations, the location management device 310 may include computing hardware used in a cloud computing environment.

The location collection device 320 may include one or more devices capable of receiving, generating, storing, processing, providing, and/or routing information associated with assigning user device movement states, as described elsewhere herein. The location collection device 320 may include a communication device and/or a computing device. For example, the location collection device 320 may include a server, such as an application server, a client server, a web server, a database server, a host server, a proxy server, a virtual server (e.g., executing on computing hardware), or a server in a cloud computing system. In some implementations, the location collection device 320 may include computing hardware used in a cloud computing environment.

The network 330 may include one or more wired and/or wireless networks. For example, the network 330 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 330 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
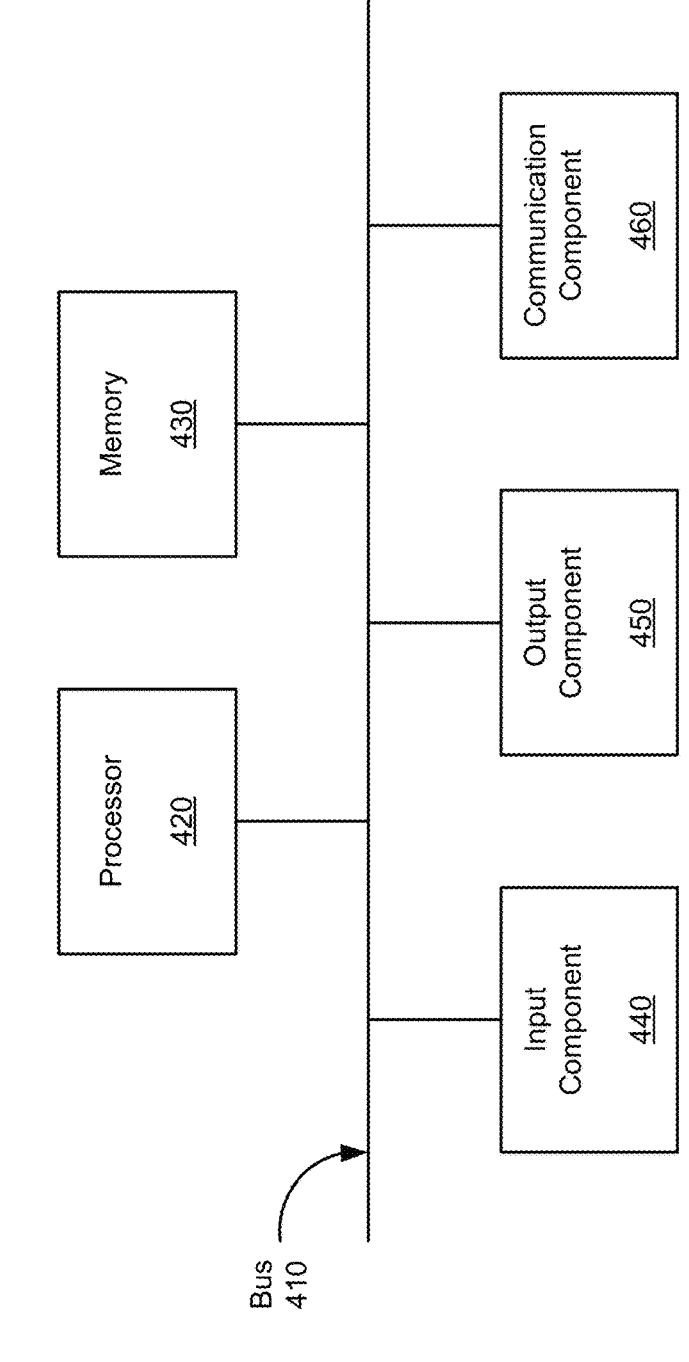
FIG. 4 is a diagram of example components of a device associated with assigning user device movement states.

FIG. 4 is a diagram of example components of a device 400 associated with assigning user device movement states. The device 400 may correspond to the location management device 310 and/or the location collection device 320. In some implementations, the location management device 310 and/or the location collection device 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 associated with assigning user device movement states. In some implementations, one or more process blocks of FIG. 5 may be performed by a location management device (e.g., location management device 310). In some implementations, one or more process blocks of FIG. 5 may be performed by another device or a group of devices separate from or including the location management device, such as the location collection device 320. Additionally, or alternatively, one or more process blocks of FIG. 5 may be performed by one or more components of device 400, such as processor 420, memory 430, input component 440, output component 450, and/or communication component 460.

As shown in FIG. 5, in some implementations, process 500 may include determining, using ground truth data, rule parameters for one or more rules (block 510). For example, the location management device may determine, using ground truth data, rule parameters for one or more rules. The ground truth data may include training data, as described elsewhere herein.

In some implementations, process 500 includes obtaining, by the device, training data that includes one or more training communication events indicating respective movement state labels, assigning, by the device and for each training communication event in the training data, a movement state for that training communication event using the one or more rules, and determining, by the device, rule parameters for respective rules of the one or more rules based on a classification performance evaluation using the movement state and the respective movement state labels, wherein the rule parameters include at least one of a weight or a rule threshold.

In some implementations, the one or more rules are associated with one or more sets of rule parameters, and the one or more sets of rule parameters are associated with respective geographic locations or respective communication environments.

As shown in FIG. 5, process 500 may include obtaining a set of one or more communication events associated with a user device (block 520). For example, the location management device may obtain a set of one or more communication events associated with a user device, as described above. In some implementations, the set of one or more communication events indicates respective locations and respective values of one or more communication parameters.

In some implementations, the one or more communication parameters include at least one of a base station identifier, a cell identifier, a timing advance parameter, a signal strength parameter, or a signal quality parameter.

As further shown in FIG. 5, in some implementations, process 500 may include performing one or more preprocessing operations for the set of one or more communication events (block 530). For example, the location management device may perform one or more preprocessing operations for the set of one or more communication events, as described above. In some implementations, the location management device may perform the one or more preprocessing operations to filter the set of one or more communication events.

In some implementations, performing the one or more preprocessing operations comprises performing an interpolation operation to regularize a time series of the set of one or more communication events from an original time series to a regular time series, performing a median filtering operation to filter the set of one or more communication events using the regular time series to obtain a filtered set of one or more communication events, and performing a resampling operation of the filtered set of one or more communication events using the original time series.

As further shown in FIG. 5, in some implementations, process 500 may include determining, for each communication event, whether the one or more rules are applicable to that communication event (block 540). For example, the location management device may determine, for each communication event, whether one or more rules are applicable to that communication event, as described above. In some implementations, the location management device may determine whether one or more rules are applicable to that communication event based on a comparison of values of the one or more communication parameters of that communication event and values of the one or more communication parameters of a previous communication event to that communication event in time, wherein an applicability of the one or more rules is indicative of movement of the user device. In some implementations, an applicability of the one or more rules is indicative of movement of the user device. In some implementations, the one or more rules are associated with respective weights.

In some implementations, a rule, of the one or more rules, is associated with a rule threshold and a communication parameter of the one or more communication parameters, and determining whether the one or more rules are applicable includes determining, for each communication event, whether a difference between a first value of the communication parameter and a second value of the communication parameter satisfies the rule threshold, wherein the first value is indicated by that communication event and the second value is indicated by the previous communication event to that communication in time, and wherein the rule is applicable to that communication event if the difference satisfies the rule threshold.

As further shown in FIG. 5, process 500 may include assigning, for each communication event, a movement state for that communication event (block 550). For example, the location management device may assign, for each communication event, a movement state for that communication event, as described above. In some implementations, the location management device may assign the movement state based on whether a score for that communication event satisfies a threshold. In some implementations, the score is a summation of one or more weights of respective rules, of the one or more rules, applicable to that communication event. In some implementations, the movement state is either a stationary state or a moving state.

In some implementations, process 500 may include determining one or more stationary events (block 560). For example, the location management device may determine one or more stationary events. For example, the location management device may determine one or more periods of time during which the user device is stationary based on the movement state of a quantity of communication events, in the set of one or more communication events, being a stationary state.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

obtaining, by a device, a set of one or more communication events associated with a user device, wherein the set of one or more communication events indicates respective values of one or more communication parameters and respective location estimates that are based on the values of the one or more communication parameters;

performing, by the device, one or more preprocessing operations to filter the set of one or more communication events;

determining, by the device and for each communication event in the set of one or more communication events, whether one or more rules are applicable to that communication event based on a comparison of values of the one or more communication parameters of that communication event and values of the one or more communication parameters of a previous communication event to that communication event in time, wherein an applicability of the one or more rules is indicative of movement of the user device, and wherein the one or more rules are associated with respective weights; and assigning, by the device and for each communication event in the set of one or more communication events, a movement state for that communication event based on whether a score for that communication event satisfies a threshold, wherein the score is a summation of one or more weights of respective rules, of the one or more rules, applicable to that communication event.

2. The method of claim 1, wherein the movement state is either a stationary state or a moving state.

3. The method of claim 1, further comprising:

obtaining, by the device, training data that includes one or more training communication events indicating respective movement state labels;

assigning, by the device and for each training communication event in the training data, a movement state for that training communication event using the one or more rules; and determining, by the device, rule parameters for respective rules of the one or more rules based on a classification performance evaluation using the movement state and the respective movement state labels, wherein the rule parameters include at least one of a weight or a rule threshold.

4. The method of claim 1, wherein the one or more rules are associated with one or more sets of rule parameters, and wherein the one or more sets of rule parameters are associated with respective geographic locations or respective communication environments.

5. The method of claim 1, wherein the one or more communication parameters include at least one of:

a base station identifier, a cell identifier, a timing advance parameter, a signal strength parameter, or a signal quality parameter.

6. The method of claim 1, further comprising:

determining one or more periods of time during which the user device is stationary based on the movement state of a quantity of communication events, in the set of one or more communication events, being a stationary state.

7. The method of claim 1, wherein performing the one or more preprocessing operations comprises:

performing, by the device, an interpolation operation to regularize a time series of the set of one or more communication events from an original time series to a regular time series;

performing, by the device, a median filtering operation to filter the set of one or more communication events using the regular time series to obtain a filtered set of one or more communication events; and performing, by the device, a resampling operation of the filtered set of one or more communication events using the original time series.

8. The method of claim 1, wherein a rule, of the one or more rules, is associated with a rule threshold and a communication parameter of the one or more communication parameters, and wherein determining whether the one or more rules are applicable comprises:

determining, for each communication event, whether a difference between a first value of the communication parameter and a second value of the communication parameter satisfies the rule threshold, wherein the first value is indicated by that communication event and the second value is indicated by the previous communication event to that communication in time, and wherein the rule is applicable to that communication event if the difference satisfies the rule threshold.

9. A device, comprising:

one or more processors configured to:

obtain a set of one or more communication events associated with a user device, wherein the set of one or more communication events indicate respective values of one or more communication parameters and respective location estimates that are based on the one or more communication parameters;

determine, for each communication event in the set of one or more communication events, whether one or more rules are applicable to that communication event based on a comparison of values of the one or more communication parameters of that communication event and values of the one or more communication parameters of another communication event, wherein the one or more rules are associated with respective weights; and assign, for each communication event in the set of one or more communication events, a movement state for that communication event based on whether a score for that communication event satisfies a threshold, wherein the score is a summation of one or more weights of respective rules, of the one or more rules, applicable to that communication event.

10. The device of claim 9, wherein the one or more processors are further configured to:

perform one or more preprocessing operations to filter the set of one or more communication events.

11. The device of claim 10, wherein the one or more preprocessing operations include a one-dimensional filtering operation.

12. The device of claim 9, wherein the one or more rules are associated with at least one of:

a criterion for at least one communication parameter of the one or more communication parameters, a rule threshold for a comparison of values of at least one communication parameter of the one or more communication parameters, or a distance threshold for a comparison of locations of that communication event and the other communication event.

13. The device of claim 9, wherein the one or more processors are further configured to:

determine that the user device is stationary at a point of interest based on the movement state of a quantity of communication events, in the set of one or more communication events, being a stationary state; and determine a dwell time at the point of interest based on a first time of a first communication event in the quantity of communication events and a second time of a last communication event in the quantity of communication events.

14. The device of claim 9, wherein the one or more processors are further configured to:

identify a quantity of communication events, in the set of one or more communication events, having the movement state being a stationary state;

determine an amount of time associated with the quantity of communication events based on a first communication event in the quantity of communication events and a second time of a last communication event in the quantity of communication events; and determine that the user device is stationary based on the amount of time satisfying a time threshold.

15. The device of claim 9, wherein changes of values of the one or more communication parameters are indicative of a movement of the user device.

16. A non-transitory computer-readable medium storing a set of instructions, the set of instructions comprising:

one or more instructions that, when executed by one or more processors of a device, cause the device to:

obtain a set of one or more communication events associated with a user device, wherein the set of one or more communication events indicate respective values of one or more communication parameters and respective location estimates that are based on the one or more communication parameters; and assign, for each communication event in the set of one or more communication events, a movement state for that communication event based on whether a score for that communication event satisfies a threshold, wherein the score is a summation of one or more weights of respective rules, of one or more rules, that are applicable to that communication event.

17. The non-transitory computer-readable medium of claim 16, wherein the one or more instructions further cause the device to:

determine, for each communication event in the set of one or more communication events, whether the one or more rules are applicable to that communication event based on a comparison of first values of the one or more communication parameters of that communication event and second values of the one or more communication parameters of a previous communication event to that communication in time.

18. The non-transitory computer-readable medium of claim 16, wherein the one or more instructions further cause the device to:

obtain training data that includes one or more training communication events indicating respective movement state labels;

assign, for each training communication event in the training data, a movement state for that training communication event using the one or more rules; and determine rule parameters for respective rules of the one or more rules based on a classification performance evaluation using the movement state and the respective movement state labels, wherein the rule parameters include at least one of a weight or a rule threshold.

19. The non-transitory computer-readable medium of claim 16, wherein the one or more instructions further cause the device to:

determine a communication environment in which the set of one or more communication events occurred; and determine a set of rule parameters for respective rules of the one or more rules based on the communication environment.

20. The non-transitory computer-readable medium of claim 16, wherein the one or more communication parameters include at least one of:

a base station identifier, a cell identifier, a timing advance parameter, a signal strength parameter.

* * * * *